US010287386B2

United States Patent
Su et al.

(10) Patent No.: US 10,287,386 B2
(45) Date of Patent: May 14, 2019

(54) CORE-SHELL PARTICLE, METHOD OF MANUFACTURING THE SAME AND APPLICATIONS THEREOF

(71) Applicant: Eternal Materials Co., Ltd., Kaohsiung (TW)

(72) Inventors: Yu-Huei Su, Kaohsiung (TW); Yu-Lin Hsiao, Kaohsiung (TW); Wen-Yen Chiu, Taipei (TW); Chi-An Dai, Taipei (TW); Chen-Han Yang, Taipei (TW); Bo-Ting Chou, Taipei (TW)

(73) Assignee: Eternal Materials Co., Ltd., Kaohsiung (TW)

( * ) Notice: Subject to any disclaimer, the term of this patent is extended or adjusted under 35 U.S.C. 154(b) by 0 days.

(21) Appl. No.: 15/663,055

(22) Filed: Jul. 28, 2017

(65) Prior Publication Data

US 2019/0031807 A1    Jan. 31, 2019

(51) Int. Cl.
| | |
|---|---|
| *C08L 83/10* | (2006.01) |
| *C08L 51/06* | (2006.01) |
| *C08L 51/08* | (2006.01) |
| *C08F 2/22* | (2006.01) |
| *C08F 279/06* | (2006.01) |
| *C08F 265/06* | (2006.01) |

(52) U.S. Cl.
CPC .............. *C08F 279/06* (2013.01); *C08F 2/22* (2013.01); *C08F 265/06* (2013.01)

(58) Field of Classification Search
USPC .................................. 523/201, 203; 525/64
See application file for complete search history.

(56) References Cited

U.S. PATENT DOCUMENTS 5,461,125 A * 10/1995 Lu .......................... C08F 265/04
                                                              523/201
5,708,093 A *  1/1998 Bastelberger ........... C04B 26/32
                                                              523/201

FOREIGN PATENT DOCUMENTS

| JP | 2012007059 A | | 1/2012 |
|---|---|---|---|
| JP | 2013139506 A | | 7/2013 |
| JP | 2016-142786 | * | 8/2016 |
| JP | 2016142786 A | | 8/2016 |
| WO | WO 2009/029979 | * | 3/2009 |

OTHER PUBLICATIONS

English abstract of JP 2002069365, Japan, Mar. 8, 2002.*
English abstract of JP 2004161894, Japan, Jun. 8, 2004.*
English abstract of CN 106084139, China, Nov. 9, 2016.*
English abstract of KR 2017028505, Korea, Mar. 4, 2017.*
Taiwanese Office Action dated Apr. 18, 2018 for Taiwanese Patent Application No. 10720329570.
Taiwanese Search Report dated Apr. 10, 2018 for Taiwanese Patent Application No. 106125397.

* cited by examiner

*Primary Examiner* — Tae H Yoon
(74) *Attorney, Agent, or Firm* — Drinker Biddle & Reath LLP

(57) ABSTRACT

The present invention is related to a core-shell particle and preparation and use thereof. The core of the core-shell particle includes a vinyl polymer. The shell of the core-shell particle includes a hydrophobic silane bonded to a surface of the core via a silane coupling agent. The core-shell particles are applied in a matting material as a matting agent.

17 Claims, No Drawings

CORE-SHELL PARTICLE, METHOD OF MANUFACTURING THE SAME AND APPLICATIONS THEREOF

FIELD OF THE INVENTION

The present invention is related to a core-shell particle and a method for making the same. The present invention is also elated to a matting composition comprising the core-shell particle as a matting agent.

BACKGROUND OF THE INVENTION

With the rising of living standard, consumers have come to prefer a matte surface to a glossy surface in many daily applications, such as furniture or interior decorations of a building or vehicle. A high gloss surface reflects a large fraction of light and thus may cause damage to an Observer's eyes. To the contrary, a low gloss or matte surface has antireflective properties, reflects fewer light and thus can reduce such damage. Furthermore, scratches on a low gloss or matte surface are more difficult to be detected due to its antireflective properties. Consequently, rapid market growth of the matting agents is expected owing to rising consumer demand.

It is known that the gloss value depends on the smoothness of a surface of an object. Therefore, one approach to reduce the gloss value, i.e., to achieving the matting effect, is to increase the roughness of the surface by applying a coating layer of a matting composition on the surface. The matting composition contains matting particles which results in a concave-convex microstructure on the coating layer, thereby the gloss value can be reduced.

Silica particles are commonly used in the industry as matting agent for its low price and ready availability. However, the problem associated with using silica particles as a matting agent is that the density of silica particles can be up to 2.2 g/cm$^3$, so the silica particles in an emulsion are easy to settle. This leaves the storage stability be not maintained for a long period. In addition, the compatibility between the inorganic silica particles and the organic resin binder is poor.

Thus, the present invention provides a novel core-shell particle, which not only possesses good matting ability but also has good compatibility with an organic resin binder.

SUMMARY OF THE INVENTION

One objective of the present invention is to provide a core-shell particle. The core of the core-shell particle includes a vinyl polymer. The shell of the core-shell particle includes a hydrophobic silane bonded to a surface of the core via a silane coupling agent.

Another objective of the present invention is to provide a matting composition comprising the core-shell particle.

A further objective of the present invention is to provide a method for preparing the core-shell particle which includes carrying out a soapless emulsion polymerization to form the core and carrying out a sol-gel reaction to form the shell.

The present invention provides at least the following advantages: (1) The core-shell particles can be synthesized by a soapless emulsion polymerization; the manufacture process is simple and environmentally-friendly and can be carried out in a continuous process. In addition, a soapless emulsion polymerization method will not affect the subsequent emulsion polymerization. (2) The core-shell particles have high hydrophobicity and low density, so they will rise up to the surface of the film, increase the roughness of the surface and reduce the gloss value of the surface. (3) Due to the presence of an organic core, the core-shell particles not only have good matting ability but also have good compatibility with an organic resin binder, and therefore, they can improve the stability of the matting composition during storage or transportation in comparison with conventional matting compositions. (4) The matting composition containing the core-shell particles of the present invention has a superior matting effect.

DETAILED DESCRIPTION OF THE INVENTION

As a result of extensive research, the inventors of the present invention have found a core-shell particle which comprises a core comprising a vinyl polymer and a shell comprising a hydrophobic silane bonded to a surface of the core via a silane coupling agent.

In an embodiment of the present invention, the core of the core-shell particle has a glass transition temperature (Tg) in the range of 0 to 60° C., preferably in the range of 5 to 50° C., more preferably 20 to 40° C.

The inventors of the present invention found that when a polymer having a Tg in the range of 0 to 60° C. is used as the core of a core shell particle, the resulting matting composition has superior matting effect. Without being limited to the theory, when the Tg of the core polymer is too low (for example, less than 0° C.), the core polymer is not strong enough to hold a spherical shape; whereas when the Tg of the core polymer is too high (for example, higher than 60° C.), the hardness of the core polymer would be overly high, which may cause a poor film-forming ability to the matting composition. In addition, when the Tg of the core polymer is too low (for example, less than 0° C.), the core-shell particles tend to aggregate with each other at room temperature and cannot be well dispersed in composition and therefore the matting effect becomes worse; on the other hand, when the Tg of the core polymer is too high, (for example, higher than 60° C.), the core-shell particles are incompatible with the binder resin, and therefore, it is difficult to form an uniform and continuous film, and the matting effect would be worse.

The Tg of the core polymer can be adjusted by the species of the monomers for forming the core polymer or the ratio (e.g. weight ratio) thereof.

In one embodiment, the core polymer of the present invention is a copolymer or homopolymer.

In one embodiment, the core of the core-shell particles of the present invention comprises a vinyl polymer.

In another embodiment, the core of the core-shell particles of the present invention consists essentially of a vinyl polymer.

The vinyl polymer of the present invention is derived from a vinyl monomer containing a carbon-carbon double bond. The vinyl monomers useful in the present invention can be, for example, but are not limited to: styrenic monomers, (meth)acrylate monomers, vinyl ester monomers, alkyl vinyl ether monomers, (meth)acrylamide monomers, nitrite monomers or a combination thereof. In addition to the above-mentioned vinyl monomers, the vinyl polymer of the present invention may optionally contain unit(s) derived from other monomers.

Examples of styrenic monomers include, but are not limited to, styrene,α-methylstyrene, p-methylstyrene, o-methylstyrene, m-methylstyrene, vinyl toluene, ethylstyrene, propylstyrene, butylstyrene, pentylstyrene, hexylstyrene, heptylstyrene, octylstyrene, and the like.

Examples of (meth)acrylate monomers include, but are not limited to, methyl acrylate, methyl methacrylate, ethyl acrylate, ethyl methacrylate, propyl acrylate, propyl methacrylate, butyl acrylate, butyl methacrylate, pentyl acrylate, pentyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl acrylate, lauryl methacrylate, isooctyl acrylate, isooctyl methacrylate, stearylacrylate, stearyl methacrylate, isodecyl acrylate, isodecyl methacrylate, isobornyacylate, isobornymethacrylate, benzyl acrylate, benzyl methacrylate, 2-hydroxyethyl (meth)aclylate phosphate, hydroxyethyl acrylate, 2-hydroxyethyl methacrylate and the like.

Examples of vinyl ester monomers include, but are not limited to, vinyl acetate, vinyl propionate, vinyl butyrate and the like.

Examples of alkyl vinyl ether monomers include, but are not limited to, methyl vinyl ether, ethyl vinyl ether and the like.

Examples of (meth)acrylamide monomers include, but are not limited to, N-methylacrylamide, N-methylmethacrylamide, N-ethyl acrylamide, N-ethyl methacrylamide.

Examples of nitrile monomers include, but are not limited to, acrylonitrile, methacrylonitrile and the like.

The species of the monomer(s) of a polymer and the ratio thereof contribute to the glass transition temperature (Tg) of the polymer. A person of ordinary skill in the art may determine the glass transition temperature of a polymer according to the Flory Fox Equation and adjust the species and ratio of the monomers accordingly:

$$\frac{1}{T_g} = \frac{W_1}{T_{g1}} + \frac{W_2}{T_{g2}} + \ldots + \frac{W_n}{T_{gn}}$$

where $T_g$ is the glass transition temperature of the polymer; $W_1, W_2, \ldots W_n$ are the weight fraction of components 1, 2 ... n; and $T_{g1}, T_{g2}, \ldots T_{gn}$ are the glass transition temperature of components 1, 2 ... n.

In the embodiments according to the present invention, the monomer ratio (weight ratio) can be adjusted such that the Tg of the core polymer is in the range of 0° C. to 60° C., for example, 0° C., 5° C., 10° C., 20° C., 30° C., 40° C., 50° C. or 60° C.

In one embodiment, the Tg of the core comprising a vinyl polymer of the present invention is in the range of 0° C. to 60° C., preferably in the range of 5° C. to 50° C., more preferably 20° C. to 40° C. The Tg of the core can be adjusted by the species of the monomers for forming the vinyl polymer or the ratio thereof. For example, the vinyl polymer can be derived from at least the following monomers: styrene monomers and (meth)acrylate monomers and then a desired Tg can be obtained by moderately adjusting the ratio (e.g. weight ratio) of the monomers. The (meth)acrylate monomers can be C1-C18alkyl (meth)acrylate, preferably C1-C10alkyl (meth)acrylate, and more preferably C1-C6alkyl (meth)acrylate.

In one embodiment, the vinyl polymer of the present invention can be a styrene-(meth)acrylate copolymer, such as a polystyrene-methyl acrylate (P(St-MA)), polystyrene-ethyl acrylate (P(St-EA)), polystyrene-n-butyl acrylate (P(St-BA), or polystyrene-n-butyl acrylate-acrylic acid (P(St-BA-AA)).

According to the present invention, the vinyl polymer can be functionalized with a hydrophobic silane to provide a hydrophobic surface i.e., a hydrophobic shell, to the particles to be synthesized. Owing to the hydrophobicity of the shell, the core-shell particles will rise up to the surface of the film during the film formation process, which results in nanoscale surface roughness and leads to a desirable matting effect.

According to the present invention, suitable hydrophobic silane is a long carbon-chain alkyl silane wherein the long carbon-chain alkyl contains 3 to 25, preferably 5 to 20, more preferably 8 to 18 carbon atoms. The long carbon-chain alkyl may be unsubstituted or substituted with halo, preferably fluoro. The long carbon-chain alkyl can be a linear or branched alkyl but has at least 3 carbon atoms arranged in a linear chain. The long carbon-chain alkyl is preferably a linear alkyl.

In an embodiment of the present invention, the hydrophobic silane is a long carbon-chain alkyl silane and has the following formula (I):

$(R^2)_y Si(OR^1)_{4-y}$         (I)

wherein:
$R^1$ is $C_1$-$C_3$ alkyl, preferably methyl or ethyl;
$R^2$ is —$(CH_2)_2$—$R^3$;
$R^3$ is alkyl or perhaloalkyl having 1 to 23 carbon atoms; and
y is an integer from 1 to 3, preferably 1.

In one embodiment of the present invention, $R^3$ is alkyl or perhaloalkyl having 1 to 23, preferably 3 to 18, and more preferably 6 to 16 carbon atoms.

In one embodiment of the present invention, $R^3$ is perfluoroalkyl having 3 to 10, preferably 4 to 8, more preferably 5 to 7 carbon atoms.

Exemplary hydrophobic silanes include, but are not limited to 1H, 1H, 2H, 2H perfluorooctyltrimethoxysilane, 1H, 1H, 2H, 2H perfluorooctyltriethoxysilane, trimethoxy(propyl)silane, trimethoxy(octyl)silane (OTS-silane), trimethoxy(octadecyl)silane (ODS-silane), decyl(triethoxy)silane, dodecyltriethoxysilane, trimethoxy(tetradecyl)silane, hexadecyltrimethoxysilane, isobutyl(trimethoxy)silane and a combination thereof.

In one embodiment, the amount of hydrophobic silane is in the range of 5 wt % to 30 wt %, based on the total weight of the core shell particle. In general, the more hydrophobic silanes are bonded to the core, the more the core-shell particles rise up to the surface of the film which increases the roughness of the surface and improves the matting effect. However, when the amount of hydrophobic silane exceeds, for example, 30 wt %, the core-shell particles may aggregate with each other which adversely affect the matting effect. On the other hand, the strong cohesion of the fluorine atoms) or the steric barrier created by the long carbon-chain may prevent the hydrophobic silane with a fluorine atom(s) or a long carbon-chain from attaching to the core-shell particle. Therefore, the amount of hydrophobic silane should not be too high. In addition, when the amount of hydrophobic silane is less than, for example, 5 wt %, it may be difficult to attach hydrophobic silane to the core-shell particle. In one embodiment of the present invention, the amount of hydrophobic silane is in the range of 5 wt % to 30 wt %, fir example, 5 wt %, 6 wt %, 8 wt %, 10 wt %, 12 wt %, 14 wt %, 16 wt %, 18 wt %, 20 wt %, 22 wt %, 24 wt %, 26 wt %, 28 wt % or 30 wt %, based on the total weight of the core shell particle.

In the present invention, a silane coupling agent is used to improve the interfacial properties between the core and shell of a core-particle, and to modify the surface of the core so that the surface of the core can be chemically bonded to the hydrophobic silane via the silane coupling agent. The silane coupling agent of the present invention has at least one ethylenically unsaturated group and at least one hydroxyl or alkoxy group. The ethylenically unsaturated group of the silane coupling agent can react with the carbon-carbon double bond of the vinyl polymer remained on the surface of the core via an addition polymerization to form a chemical bond between the silane coupling agent and vinyl polymer of the core. On the other hand, the alkoxy group of the silane coupling agent can be reduced into a hydroxyl group by reacting with water present in the reaction medium. The hydroxyl group of the silane coupling agent (including those came from alkoxy groups) undergoes a sol-gel reaction to form a chemical bond between the silane coupling agent and the hydrophobic silane of the shell.

The inventors found that by using a silane coupling agent which can chemically bond to both of the vinyl polymer of the core and the hydrophobic silane of the shell, the resulting core-shell particles have high hydrophobicity and can rise up to the surface of the film to increase the roughness of the film, so that the amount of physically scattered light can be increased and thus the matting effect can be enhanced. In addition, the organic core makes the core-shell particles of the present invention to have a lower density in comparison with silica particles conventionally used in the art. Since the core-shell particle of the present invention has a lower density and an intimate arrangement of the core-shell structure, the core-shell particle of the present invention is compatible with a binder resin, the matting composition contains the core-shell particle of the present invention is more stable. Furthermore, the method for preparing the core-shell particles of the present invention is easy to manipulate. It is easy to control or adjust the amount of hydrophobic silane bonded to the surface of the core, and therefore, it is easier to design and prepare core-shell particles with desirable properties.

Exemplary silane coupling agents include, but are not limited to styrylethyltrimethoxysilane, methacryloxypropyltrimethoxysilane, triethoxysilyl modified poly-1,2-butadiene, vinylethoxysiloxanehomopolymer, vinylmethoxysiloxanehomopolymer, allyltrimethoxysilane, vinyltriisopropoxysilane, (3-acryloxypropyl)trimethoxysilane, or triethoxyvinylsilane.

In one embodiment, the silane coupling agent is vinyl silane having the following formula (II):

wherein $R^4$ is an ethylenically unsaturated group; $R^5$ is H or $C_1$-$C_3$ alkyl (e.g., methyl, ethyl or propyl); and p is an integer from 1 to 3, preferably 1. Examples of the ethylenically unsaturated group include, but are not limited to, ethenyl, propenyl, butenyl, ethenylphenyl, propenylphenyl, ethenylphenylethyl, propenyloxymethyl, propenyloxyethyl, propenyloxypropyl, propenyloxybutyl, propenyloxypentyl, propenyloxyhexyl, methylpropenyloxymethyl, methylpropenyloxyethyl, methylpropenyloxypropyl, methylpropenyloxybutyl, methylpropenyloxypentyl, methylpropenyloxyhexyl, a group of the following formula (7) and a group of the following formula (8):

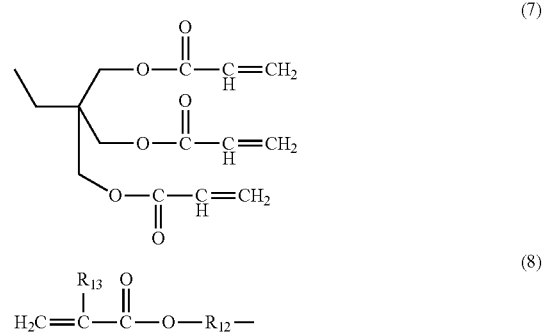

wherein $R_{12}$ is a phenylene, linear or branched $C_1$-$C_8$ alkylene, linear or branched $C_2$-$C_8$ alkenylene, $C_3$-$C_8$ cycloalkylene, or linear or branched $C_1$-$C_8$ hydroxyalkylene; and $R_{13}$ is hydrogen or linear or branched $C_1$-$C_4$ alkyl.

The amount of the silane coupling agent is not particular limited and can be adjusted depending on the desired amount of the hydrophobic silane. In the embodiments of the present invention, the amount of the silane coupling agent is in the range of 5 wt % to 25 wt %, for example, 5 wt %, 6 wt %, 8 wt %, 10 wt %, 12 wt %, 14 wt %, 16 wt %, 18 wt %, 20 wt %, 22 wt % or 24 wt %, based on the total weight of the core-shell particle. It is found that when the amount of silane coupling agent exceeds, for example, 25 wt %, the silane coupling agent may undergo a sol-gel reaction by itself, which adversely affects the sol-gel reaction between the silane coupling and the hydrophobic silane. In contrast, when the amount of silane coupling agent is less than, for example, 5 wt %, the amount of the hydrophobic silan chemically bonded to the vinyl polymer of the core via the silane coupling agent may be insufficient.

In some embodiments of the present invention, an average particle size of the core-shell particles is 10 to 1,000 nm, in particular, preferably 10 to 500 nm, more preferably 10 to 300 nm.

The core-shell particles of the present invention can be prepared by any suitable method known in the art. In one embodiment, the core-shell particles of the present invention are prepared by carrying out a soapless emulsion polymerization to form the core and a sol-gel process to form the shell. For example, the core-shell particles of the invention can be prepared, for example, by the following steps:

(a) polymerizing vinyl monomers in an aqueous solution to form vinyl polymer particles;
(b) swelling the vinyl polymer particles with the addition of a silane coupling agent;
(c) reacting the vinyl polymer particles with the silane coupling agent to bond the silane coupling agent to the surface of the vinyl polymer particles; and
(d) reacting hydrophobic silanes with the silane coupling agent bonded to the surface of the vinyl polymer particles.

It is known in the art to use a surfactant (or emulsifier) in an emulsion polymerization; however, there are some disadvantages of this technique, including pollution to the environment and the complexity of removing the surfactant (or emulsifier) after polymerization. According to preferred embodiments of the present invention, in step (a), the core is prepared by a soap-free emulsion polymerization (i.e., without the use of surfactant or emulsifier) comprising polymerizing the vinyl monomers in an aqueous solution at an elevated temperature (for example, 75° C.) under nitrogen atmosphere in the presence of an initiator until the conversion reaches 60 to 80%. The conversion referred to herein is defined as follows:

Conversion (%)=[(the total number of onomers of the reactants)−(the total number of the corresponding units in the product)]/[the total number of monomers of the reactants]

An incomplete conversion in the soap-free emulsion polymerization ensures that a sufficient amount of carbon-carbon double bonds be remained in the core. Since the carbon-carbon double bonds from the monomers are not completely depleted, the unreacted carbon-carbon double bonds can react with the vinyl silane coupling agent in a subsequent step and form the core-shell particles of the present invention. As compared with emulsion polymerization, a soap-free emulsion polymerization not only can reduce the disadvantages as described above but also provide the advantages, such as a monodispersity of particle size and a smaller molecular weight of the resulting polymer. In addition, the polymerization rate of a soap-free emulsion polymerization is much slower than that of an emulsion polymerization, and therefore, the soap-free emulsion polymerization is suitable to obtain a predetermined conversion.

In step (b), the vinyl polymer particles are swollen with the addition of a silane coupling agent, preferably with the addition of a silane coupling agent and styrene dissolved in a solvent, such as methanol and the like. The addition of styrene is beneficial to guide the silane coupling agent to the vinyl polymer particles due to the affinity between the newly added styrene and the unreacted vinyl monomers (such as styrene and n-butyl acrylate in the case of polystyrene-n-butyl acrylate polymer) of the vinyl polymer. The amount of styrene is preferably in the range of 3 wt % to 5 wt %, for example, 3 wt %, 3.3 w %, 3.5 wt %, 3.8 wt %, 4 wt %, 4.3 wt %, 4.5 wt %, 4.8 wt %, or 5 wt % based on the total weight of the core particles. Since styrene has high hydrophobicity and intermolecular forces (π-π attractive forces), if an excessive amount of styrene is added, self-coalescence of styrene may occur and silane coupling agentmay undergo sol gel reaction by itself. Therefore, the amount of styrene should not be too high. In the presence of methanol or similar solvents, styrene can move together with the silane coupling agent. The amount of the silane coupling agent is preferably in the range of 5 wt % to 25 wt %, for example, 5 wt %, 8 wt %, 10 wt %, 13 wt %, 15 wt %, 18 wt %, 20 wt %, 23 wt % or 25 wt %, based on the total weight of the core-shell particle. An excess amount of the silane coupling agent may cause the silane coupling agent undergoes the sol gel reaction by itself An insufficient amount of the silane coupling agent will reduce the amount of the hydrophobic silane bonded to the core thereby affecting the matting effect.

In step (c), the vinyl polymer particles react with the silane coupling agent in the presence of an initiator such that the silane coupling agent is bonded to the surface of the vinyl polymer particles.

The initiator useful in steps (a) and (c) can be, for example, but is not limited peroxides. Examples of peroxides include, but are not limited to tert-butylhydroperoxide, hydrogen peroxide, ammoniuria persulfate, potassium persulfate and sodium persulfate.

In step (d), hydrophobic silanes react with the silane coupling agent bonded to the surface of the vinyl polymer particles in a sol-gel process and form the core-shell particles of the present invention. The suitable amount of the hydrophobic silanes is as described above. The cores are more likely to encounter the hydrophobic silane and undergo sol-gel reaction with it if there is more hydrophobic silane in the system. To the contrary, if the amount of hydrophobic silane is too less, only a few of hydrophobic silane is bonded to the surface of the cores and thereby adversely affects the matting effect.

The advantages of a sol-gel reaction are as follow:
(1) Highly pure products can he obtained by removing the precursors via distillation or other simple purifying methods.
(2) The low reaction temperature can prevent the materials from reacting with the container walls.
(3) The shape and size of the particles can be precisely controlled by varying the experimental conditions.
(4) The sol-gel reaction can be catalyzed with nano-sized catalysts having large specific areas.

The sol-gel reaction can be carried out in an acidic or alkaline environment, depending on the species of the hydrophobic silanes and desired properties (e.g., particle size) of the particles, Under acidic conditions, the hydrolysis rate of hydrophobic silanes is faster but the condensation rate for acidic conditions is much slower. The fast hydrolysis rate and slow condensation rate lead to smaller core-shell particles. In contrast, under alkaline conditions, the condensation rate is faster than the hydrolysis rate, leading to larger core-shell particles. The sol-gel reaction can be conducted at either an acidic condition or an alkaline condition. The pH value of the sol-gel reaction may be determined based on the desirable reaction rate and the desired properties of the core-shell particles. In an embodiment of the present invention, the sol-gel reaction is conducted at a pH value of 2 to 11, for example 3, 4, 5, 6, 7, 8, 9 or 10.

Also provided herein is a matting composition comprising the core-shell particles of the present invention as matting agent. In one embodiment of the present invention, the matting composition comprises the above core-shell particles and a binder resin.

The binder resin used in the present invention is for dispersing the core-shell particles. The binder resin useful in the present invention can be any suitable resin, for example, a thermosetting resin. Examples of thermosetting resin includes, but is not limited to an acrylic or acrylate resin, a methacrylic or methacrylate resin, a polyimide resin, a polyurethane resin, a polyester resin, a polyimide resin, an alkyd resin, an epoxy resin, a phenolic resin or combinations thereof, preferably an acrylate resin or a methacrylate resin.

In some embodiments of the present invention, the binder resin is an acrylic emulsion (Etersol 1135-9; Eternal Materials Co. Ltd.)

In some embodiments of the present invention, the matting composition comprises: 3 wt % to 25 wt %, preferably 5 wt % to 20 wt %, and more preferably 10 wt % to 17 wt %, of the core-shell particles based on the total weight of the solids content of the matting composition.

The matting composition of the present invention may optionally include water, solvent, or suitable additive known in the art such as film forming agent, surfactant, fillers, pigment, or other processing aids.

The present disclosure will be described in terms of the following embodiments. In addition to the following embodiments, the present disclosure can be carried out in other ways without departing from the spirit of the present disclosure; the scope of the present disclosure should not be interpreted and limited solely according to the disclosure of the specification. In addition, unless otherwise stated herein, the terms "a/an," "the" and the like used in the specification (especially in the appended claims) should be understood as including both singular and plural forms. The word "about" is used to describe the measured value including an acceptable error, depending partially on how the measurement is carried out by a person of ordinary skill in the art. The word "or" in reference to a list of two or more items covers all of the following interpretations of the word: any of the items in the list, all of the items in the list, and any combination of the items in the list. The words "herein," "above," "below," and words of similar import, when used in this application, shall refer to this application as a whole and not to any particular portions of this application.

EXAMPLES

Example 1

Preparation of a Matting Composition

1. Formation of the Vinyl Polymer Core via a Soapless Emulsion Polymerization 200 g DI water and a total weight of 20 g Styrene (Acros Organics, 99% purity) and butyl acrylate (Acros Organics, 99% purity) were added into a reactor. The weight ratio of styrene and butyl acrylate was recorded in Table 1 for each sample. The mixture was degassed under nitrogen atmosphere for 30 min at 300 rpm agitation and then heated to 75° C. followed by the addition of 1 g potassium persulfate dissolved in 20 g DI water. The mixture was kept at 75° C. for 4 hours to produce (P(St-BA)) copolymer cores with a conversions of 60 to 70%.

2. Formation of the Shell via a Sol-Gel Reaction

The P(St-BA) copolymer latex particles were swollen for 24 hours at room temperature with the addition of triethoxyvinylsilane (silane coupling agent; Acros Organics, 97% purity) and 1.6 g styrene (15.2 mmol; Acros Organics, 99% purity) dissolved in 40 g methanol. The amount of silane coupling agent was recorded in Table 1 for each sample. The mixture was degassed under nitrogen atmosphere for 30 min at 300 rpm agitation and then heated to 75° C. followed by the addition of 2g potassium persulfate dissolved in 40 g DI water. The mixture was kept at 75° C. for 24 hours to produce P(St-BA) copolymer latex particles modified by triethoxyvinylsilane on the surface.

The modified P(St-BA) copolymer latex particles were cooled to room temperature and then blended with hydrophobic silane dissolved in 40 g methanol. The species and amount of hydrophobic silane for each sample were recorded in Table 1. A sol-gel reaction was carried out at room temperature for 2 hours to produce core-shell particles having a shell of hydrophobic silane and a core of P(St-BA) copolymer.

3. Preparation of a Matting Composition

The produced core-shell particles were blended with an acrylic emulsion (Etersol 1135-9; Eternal Materials Co. Ltd.) containing 1 wt % of anionic surfactant to prepare a matting composition. The species of anionic surfactants is not particularly limited and can be any anionic surfactants that is suitable for the matting composition of the present invention. The examples provided herein used sodium dodecyl sulfate (SDS) as the anionic surfactant. In addition, the blending method is not particularly limited and can be performed, for example, by the following steps:

(a) 50 g Etersol 1135-9 acrylic emulsion was poured into a 250 ml beaker and stirred for about 3 min at 1000 rpm agitation speed under water bath at 40 to 45° C. with the addition of 1% SDS surfactant solution (comprising 1 g SDS and 99g water) to prepare an acrylic emulsion.
(b) 3.75 g core-shell particles were added to the acrylic emulsion prepared in (a).
(c) 5 g film forming agent (Dipropylenegloycol n-butyl ether (DPnB) was then added to the acrylic emulsion containing the core-shell particles.
(d) The mixture was well stirred at 1000 rpm agitation speed for 30 minutes and stood for 1 day.

Example 2

Characterization of Matting Effect

The matting composition was coated onto a glass substrate by using a ¼"×16" wire wound rod (RD Specialties) and formed a film on the glass substrate. The glass substrate and the film were heated in an oven at 50° C. for 3 days for drying and removing DPnB from the film. 60° gloss of the film was measured by Novo-Gloss 60° glossmeter according to ASTM D523 to evaluate the matting effect of the matting composition. The result was recorded in Table 1 (value of 60° gloss: ⊚10 to 40; ○ 41 to 70; Δ71 to 90; x>90).

TABLE 1

| Sample No. | P(St-BA) monomer ratio (St:BA) | Theoretical Tg of p(St-BA)[6] (° C.) | Amount of silane coupling agent (wt. %)[1] | Hydrophobic silane | Amount of hydrophobic silane (wt. %)[1] | Matting effect[6] |
|---|---|---|---|---|---|---|
| Sample 1 | 8:2 | 54.0 | 12.00 | F-silane[2] | 14.0 | Δ |
| Sample 2 | 3:1 | 44.3 | 12.00 | F-silane[2] | 14.0 | ○ |
| Sample 3 | 7:3 | 35.0 | 12.00 | F-silane[2] | 14.0 | ⊚ |
| Sample 4 | 6:4 | 18.1 | 12.00 | F-silane[2] | 14.0 | ○ |
| Sample 5 | 1:1 | 3.0 | 12.00 | F-silane[2] | 14.0 | Δ |
| Sample 6 | 7:3 | 35.0 | 6.43 | 18-silane[3] | 6.0 | Δ |
| Sample 7 | 7:3 | 35.0 | 9.00 | 18-silane[3] | 10.5 | ○ |
| Sample 8 | 7:3 | 35.0 | 12.00 | 18-silane[3] | 14.0 | ○ |
| Sample 9 | 7:3 | 35.0 | 18.00 | 18-silane[3] | 21.0 | ○ |
| Sample 10 | 7:3 | 35.0 | 24.00 | 18-silane[3] | 28.0 | ○ |
| Sample 11 | 7:3 | 35.0 | 12.00 | 8-silane[4] | 28.0 | ○ |
| Sample 12 | 7:3 | 35.0 | 12.00 | 3-silane[5] | 7.0 | Δ |
| Comparative Sample 1 | 7:3 | 35.0 | NA | NA | NA | X |
| Comparative Sample 2 | 4:6 | −10.8 | 12.00 | F-silane[2] | 14.0 | X |

TABLE 1-continued

| Sample No. | P(St-BA) monomer ratio (St:BA) | Theoretical Tg of p(St-BA)[6] (° C.) | Amount of silane coupling agent (wt. %)[1] | Hydrophobic silane | Amount of hydrophobic silane (wt. %)[1] | Matting effect[6] |
|---|---|---|---|---|---|---|
| Comparative Sample 3 | 9:1 | 75.5 | 12.00 | F-silane[2] | 14.0 | X |
| Comparative Sample 4 | 7:3 | 35.0 | 30.00 | 18-silane[3] | 35.0 | X |

[1]based on the total weight of the core-shell particle (Take Sample 1 for example, the total weight of the core-shell particle is: 20/(100%-12%-14%) = 27.03 g)
[2]F-silane: 1H, 1H, 2H, 2H perfluorooctyltriethoxysilane
[3]18-silane: trimethoxy(octadecyl)silane (ODS-silane)
[4]8-silane: trimethoxy(octyl)silane (OTS-silane)
[5]3-silane: trimethoxy(propyl)silane
[6]Theoretical Tg temperatures were obtained based on the Flory Fox Equation depicted in paragraph [0019] where Tg of polystyrene is 373K and Tg of poly(butyl acrylate) is 219K.

The matting composition of Comparative Sample 1 contained P(St-BA) particles without any surface modification. The 60° gloss value of the film prepared from Comparative Sample 1 was too high which shows that the P(St-BA) particles without any surface modification cannot provide a desired matting effects.

The matting compositions of Samples 1 to 5 contained the P(St-BA) particles whose surface was modified by F-silane with an amount of 14 wt % based on the total weight of the core-shell particle. The 60° gloss values of the films prepared from Samples 1 to 5 were lower than those of the films prepared from the comparative examples which prove that the P(St-BA) particles modified by F-silane could achieve a desired matting effect.

The matting compositions of Samples 6 to 11 contained the P(St-BA) particles whose surface was modified by a long carbon-chain alkyl silane (OTS- or ODS-silane) in different amounts. The 60° gloss values of the films prepared from Samples 6 to 10 were in the grade "○" or "Δ" which prove that the P(St-BA) particles modified by a long carbon-chain alkyl silane could achieve a desired matting effect.

The matting results of the films prepared from Comparative Samples 2 and 3 and Samples 1 to 5 show that when the Tg of the P(St-BA) particles is less than 0° C. (for example, −10.8° C.) or greater than 60° C. (for example, 75.5° C.), the matting effect is worse.

In view of the 60° gloss values of the films prepared from Samples 6 to 10 and Comparative Sample 4, it was found that the more hydrophobic silanes are used, the better the matting effect is; however, when the amount of hydrophobic silane exceeds 30 wt % (for example, 35 wt %), the matting effect becomes worse and particle aggregation can be observed.

What is claimed is:

1. A core-shell particle, comprising:
a core comprising a vinyl polymer; and
a shell comprising a hydrophobic silane bonded to a surface of the core via a silane coupling agent,
wherein the hydrophobic silane has the following formula (I):

$$(R^2)_y Si(OR^1)_{4-y} \qquad (I)$$

wherein:
$R^1$ is $C_1$-$C_3$ alkyl;
$R^2$ is $-(CH_2)_2-R^3$;
$R^3$ is alkyl or perhaloalkyl having 1 to 23 carbon atoms; and
y is an integer from 1 to 3.

2. The core-shell particle according to claim 1, wherein the Tg of the core is in the range of 0° C. to 60° C.

3. The core-shell particle according to claim 1, wherein the Tg of the core is in the range of 5° C. to 50° C.

4. The core-shell particle according to claim 1, wherein the Tg of the core is in the range of 20° C. to 40° C.

5. The core-shell particle according to claim 1, wherein the hydrophobic silane is a long carbon-chain alkyl silane having 3 to 25 carbon atoms.

6. The core-shell particle according to claim 1, wherein the hydrophobic silane is present in an amount of 5 wt % to 30 wt % based on the total weight of the core-shell particle.

7. The core-shell particle according to claim 1, wherein the silane coupling agent is present in an amount of 5 wt % to 25 wt % based on the total weight of the core-shell particle.

8. The core-shell particle according to Claim 1, wherein the hydrophobic silane is selected from 1H, 1H, 2H, 2H perfluorooctyltrimethoxysilane, 1H, 1H, 2H, 2H perfluorooctyltriethoxysilane, trimethoxy(propyl)silane, trimethoxy(octyl)silane, trimethoxy(octadecyl)silane, decyl (triethoxy)silane, dodecyltriethoxysilane, trimethoxy(tetradecyl)silane, hexadecyltrimethoxysilane, isobutyl (trimethoxy)silane and a combination thereof.

9. The core-shell particle according to claim 1, wherein the vinyl polymer is derived from a vinyl monomer containing a carbon-carbon double bond.

10. The core-shell particle according to claim 9, wherein the vinyl monomer is selected from the group consisting of styrenic monomer, (meth)acrylate monomers, vinyl ester monomer, alkyl vinyl ether monomer, (meth)acrylamide monomer, nitrile monomer and a combination thereof.

11. The core-shell particle according to claim 9, wherein the vinyl monomer comprises styrenic monomer and (meth)acrylate monomer.

12. The core-shell particle according to claim 9, wherein the vinyl polymer is polystyrene-n-butyl acrylate (P(St-BA)).

13. The core-shell particle according to claim 1, wherein the silane coupling agent has at least one ethylenically unsaturated group and at least one hydroxyl or alkoxy group.

14. The core-shell particle according to claim 1, wherein the silane coupling agent is vinyl silane having the following formula (II):

$$(R^4)_p Si(OR^5)_{4-p} \qquad (II)$$

wherein $R^4$ is an ethylenically unsaturated group; $R^5$ is H or $C_1$-$C_3$ alkyl; and p is an integer from 1 to 3.

15. The core-shell particle according to claim 1, wherein the silane coupling agent is styrylethyltrimethoxysilane, methacryloxypropyl-trimethoxysilane, triethoxysilyl modified poly-1,2-butadiene, vinylethoxysiloxane homopolymer, vinylmethoxysiloxane homopolymer, allyltrimethoxysilane, vinyltriisopropoxysilane, (3-acryloxypropyl)trimethoxysilane or triethoxyvinylsilane.

16. A method for preparing the core-shell particle of claim 1 comprising carrying out a soapless emulsion polymerization to form the core and a sol-gel reaction to form the shell.

17. A matting composition, comprising core-shell particles according to claim 1.

* * * * *